(12) United States Patent
Bouvin et al.

(10) Patent No.: US 8,120,577 B2
(45) Date of Patent: Feb. 21, 2012

(54) EYE TRACKER WITH VISUAL FEEDBACK

(75) Inventors: Johan Bouvin, Nacka (SE); Per Runemo, Stockholm (SE)

(73) Assignee: Tobii Technology AB, Danderyd (SE)

( * ) Notice: Subject to any disclaimer, the term of this patent is extended or adjusted under 35 U.S.C. 154(b) by 847 days.

(21) Appl. No.: 12/090,282

(22) PCT Filed: Oct. 19, 2006

(86) PCT No.: PCT/SE2006/050411
§ 371 (c)(1),
(2), (4) Date: Aug. 27, 2008

(87) PCT Pub. No.: WO2007/050029
PCT Pub. Date: May 3, 2007

(65) Prior Publication Data
US 2009/0125849 A1    May 14, 2009

Related U.S. Application Data

(60) Provisional application No. 60/732,890, filed on Nov. 2, 2005.

(30) Foreign Application Priority Data

Oct. 28, 2005  (SE) ...................................... 0502398

(51) Int. Cl.
*G09G 5/08* (2006.01)
*G06F 3/033* (2006.01)
(52) U.S. Cl. ........................................ 345/157; 715/863
(58) Field of Classification Search .................. 345/156, 345/157; 715/863
See application file for complete search history.

(56) References Cited

U.S. PATENT DOCUMENTS

| | | | |
|---|---|---|---|
| 6,351,273 | B1 | 2/2002 | Lemelson et al. |
| 7,487,461 | B2 * | 2/2009 | Zhai et al. ...................... 715/773 |
| 2002/0105482 | A1 * | 8/2002 | Lemelson et al. ................ 345/7 |
| 2003/0038754 | A1 | 2/2003 | Goldstein et al. |
| 2005/0047629 | A1 | 3/2005 | Farrell et al. |
| 2005/0243054 | A1 * | 11/2005 | Beymer et al. ................ 345/156 |

FOREIGN PATENT DOCUMENTS

EP    0816983 A2    1/1998

OTHER PUBLICATIONS

International Search Report.

* cited by examiner

*Primary Examiner* — Stephen Sherman
(74) *Attorney, Agent, or Firm* — Moore & Van Allen PLLC; W. Kevin Ransom

(57) ABSTRACT

The present invention relates to entry of control commands into a computer in response to eye-tracker detected movement sequences of a point of regard over a graphical display, which is associated with the computer. A processing module in the computer causes the display to present graphical feedback information in the form of a data-manipulating window, which visually confirms any entered control commands. The data-manipulating window is presented at a position relative to an active control object on the display, such that a center point of the window is located within a relatively small offset distance from a center point of the active control object. The window includes graphical information, which symbolizes and activity portion of the display presently being the object of an eye-tracker-controlled entry of control commands. Moreover the information in the window is repeatedly updated in response to the eye-tracker-controlled entry of control commands.

26 Claims, 4 Drawing Sheets

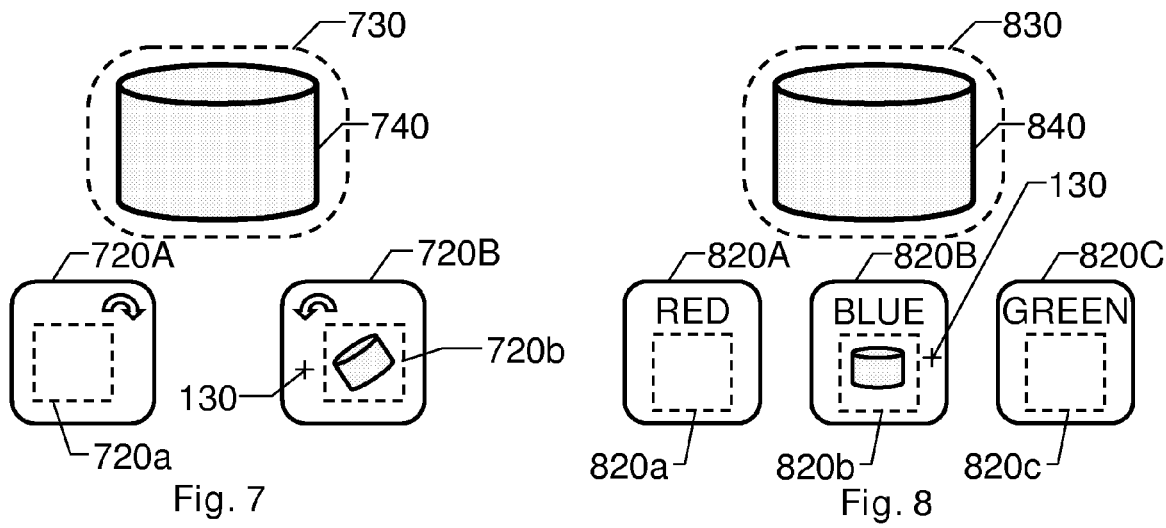
Fig. 7
Fig. 8
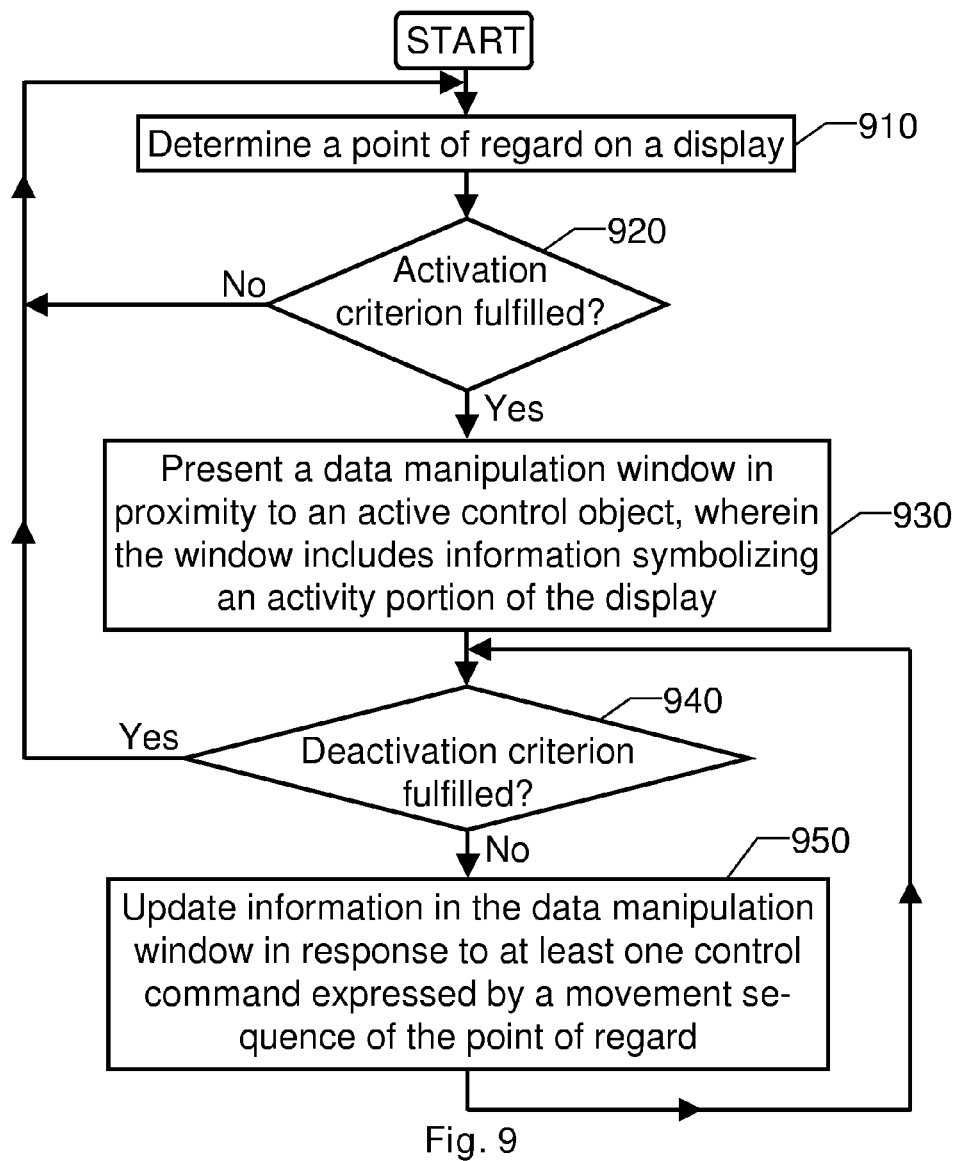
Fig. 9

EYE TRACKER WITH VISUAL FEEDBACK

CROSS REFERENCE TO RELATED APPLICATIONS

The present application claims priority to U.S. Provisional Patent Application Ser. No. 60/732,890 titled "Eye Tracker With Visual Feedback" filed on Nov. 2, 2005.

THE BACKGROUND OF THE INVENTION AND PRIOR ART

The present invention relates generally to automatic eye tracking wherein visual feedback information is presented to the user during operation of the eye tracker. More particularly the invention relates to a system according to the preamble of claim 1 and a method according to the preamble of claim 13. The invention also relates to a computer program according to claim 25 and a computer readable medium according to claim 26.

The concept of eye tracking is well known in the art, and a number of different techniques have been developed for accomplishing automatic eye and gaze tracking. In the area of remote, non-obtrusive eye tracking, the most commonly used designs are based on so-called pupil center corneal reflection (PCCR) methods, which render it possible to determine the eyes' positions as well as their gaze direction. Thus, it is possible to estimate a point of regard, for instance on a computer display, such that based on such estimations a user may enter commands to the computer.

However, the known eye-controlled solutions often fail to accomplish a fully satisfying user-interaction with the computer. One common problem is that the eye-controllable input interface imposes comparatively heavy motor tasks on the user's eyes, which are truly perceptive sensory organs. This may lead to fatigue symptoms and discomfort experienced by the user. Another problem is that the user, who perhaps is a handicapped person, may have problems to control his/her gaze with sufficiently high precision to control the computer as desired. Of course, this problem is particularly accentuated if the eye-controllable screen objects are small. Additionally, even if the user is capable of controlling his/her gaze with very high precision, imperfections in the eye-tracking equipment may introduce measurement errors in respect of an estimated point of regard on the display. Aiming to improve the man-machine interface the U.S. Pat. No. 6,152,563 proposes that so-called collapsing symbols be presented over a selected window object in order to visually confirm the selection of the object during an interval prior to any manipulation. Thus, the user can abort an erroneous selection before the manipulation in respect of the object is effected. The article also proposes the use of zoom windows to enhance the precision of the user's gaze fixations on certain on-screen objects.

However, it is not only difficult to adequately estimate the user's point of regard. Another dilemma in eye tracking is that it may be problematic for the user to accomplish a selection of an on-screen object, or by other means initiate a computer-controlled action. Expressing the user's intent to the computer via an eye-controlled interface may be difficult for many reasons. One major issue is the fact that the eyes are designed for perception, not for motor tasks, and therefore the gaze moves over the display also when the user registers information thereon, however not is interested in generating any control commands. A dwell time, i.e. the time during which the user fixates his/her gaze on an object on the screen, may be used to express the user's intention to manipulate a certain object. A disadvantage by this approach is that the interaction process becomes relatively slow, and risk annoying the user. Confirmation commands in the form of blinks may speed up the process substantially. However, human blinks are often unintentional, and hence the user might produce many undesired control commands. Of course, a physical button, or a key, provides a much more reliable confirmation means. Nevertheless this option may not be open to the user, who perhaps is incapable of manipulating such buttons/keys. Confirmation via a voice recognition interface constitutes yet another alternative, which is less reliable, and perhaps still not a viable option for the user due to physical disablement, or factors in the environment in which the system is used, such as noise.

The human gaze pattern includes so-called saccades, which represent rapid movements of the gaze from one point to another. These movements are almost never involuntary, excluding nystagmus patients. However, using saccades to enter data or commands via an eye-controllable input interface is problematic for other reasons. Namely, if a saccade activates a function in respect of a particular on-screen object, typically the saccade itself results in that the user no longer observes this object, at least not directly. Consequently, further eye-controlled manipulation of the object becomes very difficult, if at all possible. Again, this is a problem related to the combined motor and perception tasks placed on the eyes by the eye-controllable input interface.

The cursor symbol is generally an important object to control when interacting with a computer. However, this is not straight-forward either. Namely, the most high-resolution part of the retina, the macula (or the yellow spot), measures a diameter equivalent to a field of view of one degree. Therefore, a human being never needs to direct his/her gaze with a higher precision than what is given by this measure, i.e. within one degree. Hence, regardless of how high precision the eye-tracker has, a perfect match between the user's gaze and an on-screen cursor symbol still cannot be accomplished. Instead, any cursor symbol being directly controlled in response to an estimated point of regard is bound to introduce artifacts, which will be perceived as errors by a human user. Nevertheless, U.S. Pat. No. 6,637,883 describes an eye-tracking system for displaying a video screen pointer at a point of regard of a user's gaze. For enhanced precision, the camera which registers the eyes' movements is here positioned in an eyeglass frame worn by the user. Naturally, this imposes separate problems, i.a. related to fitting and comfort.

Instead of controlling the cursor symbol in direct response to the estimated point of regard, relative cursor controls are normally preferable, i.e. solutions wherein the cursor is caused to move indirectly by manipulation of a particular control means on the screen for each direction up/down and left/right. However, when placing the point of regard on such a control means, the user cannot see the cursor symbol to be controlled any longer.

U.S. Pat. No. 6,204,828 discloses an integrated gaze/manual cursor positioning system, which aids an operator to position a cursor by integrating an eye-gaze signal and a manual input. When a mechanical activation of an operator device is detected the cursor is placed at an initial position which is predetermined with respect to the operator's current gaze area. Thus, a user-friendly cursor function is accomplished, however no cursor-based commands are input to the computer based on the eye-gaze signal.

The published U.S. patent application No. 2005/0047629 describes a solution wherein, upon activation of a mechanical input device, a region of the screen to which a user's gaze is directed is expanded, so that selection of objects within this region is facilitated. Components located immediately outside of a radius from the gaze point may be contracted and/or translated in connection with this expansion. The mechanical input device, such as a conventional mouse, is then used to control a graphical pointer to said region to effect the selection command. Nonetheless, also this strategy is problematic because it requires a mechanical input device, and it only provides one possible position for the eye controllable interface and thus offers no options for having more than one type of eye control signal. Hence, the degree of flexibility is relatively low.

SUMMARY OF THE INVENTION

The object of the present invention is therefore to provide an efficient, reliable and user-friendly eye-tracker solution, which alleviates the above problems and thus enables an adequate information feedback to the user without sacrificing the user's capabilities to control the events on the display.

According to one aspect of the invention, the object is achieved by the system as initially described, wherein the processing module is adapted to investigate whether the movement sequence of the point of regard fulfills an activation criterion with respect to an activation zone for any of the at least one control command. If the processing module finds that such a criterion is fulfilled, the module presents a data-manipulating window at a position relative to an active control object on the display, such that a center point of the window is located within a relatively small offset distance from a center point of the active control object. For example, the data-manipulating window may be presented in the active control object on the display. However, a window position immediately proximate to, or partly overlapping, the active control object is equally well conceivable. The window shall at least be located such that a user may actively observe both the active control object and the data-manipulating window at the same time. The data-manipulating window includes graphical information, which symbolizes an activity portion of the display presently being the object of an eye-tracker-controlled entry of control commands. The processing module is also adapted to repeatedly update the information in the data-manipulating window in response to the eye-tracker-controlled entry of control commands.

One important advantage of this system is that the user obtains adequate information about the manipulation object, while concentrating his/her gaze on the control object. This vouches for an efficient and comfortable man-machine interaction.

According to one preferred embodiment of this aspect of the invention, the processing module is adapted to determine the active control object based on the movement sequence of the point of regard relative to the activation zone, e.g. on the basis of a fixation and smooth pursuit track. However, preferably, a first saccade in the point of regard registered from the activation zone designates the active control object. Thus, the active control object is identified in a very intuitive and user-friendly manner.

According to another preferred embodiment of this aspect of the invention, the at least one control command expresses a navigation direction for a cursor symbol with respect to the display, a rotation of at least one on-screen representation of at least one graphical user interface (GUI)-component on the display, a color change of at least one on-screen representation of at least one GUI-component on the display, and/or a texture modification of at least one on-screen representation of at least one GUI-component on the display. Hence, a large degree of freedom is provided in terms of the manipulations enabled via the proposed interface.

According to yet another preferred embodiment of this aspect of the invention, the control command is specifically presumed to express a navigation direction for a cursor symbol with respect to the display. Here, the processing module is adapted to discriminate a navigation direction from the first saccade relative to the activation zone, and move a cursor symbol over the display in agreement with the navigation direction. This has been found to provide a highly efficient relative cursor control function.

According to a further preferred embodiment of this aspect of the invention, the processing module is adapted to present a set of control objects on the display, where each control object in the set is adapted to indicate a respective navigation direction for the cursor symbol relative to an information area. For example, a first control object may be adapted to indicate a rightward cursor-symbol movement, a second control object may be adapted to indicate a downward cursor-symbol movement, and so on. Thereby, a robust and reliable control interface is presented to the user.

According to a first preferred embodiment of this aspect of the invention, the processing module is adapted to present the set of control objects on the display in such a manner that said set moves gradually across the display in agreement with the navigation direction. Additionally, the processing module is adapted to move the cursor over the display in agreement with the navigation direction. This eye-tracking-based cursor-symbol control is generally preferable when a largest possible active display area is desired.

According to a second preferred embodiment of this aspect of the invention, the processing module is instead adapted to present the set of control objects at fixed positions on the display. However, also here, the processing module is adapted to move the cursor symbol over the display in agreement with the navigation direction. This provides an alternative eye-controllable means for the user to influence the cursor symbol position while being able to visually register this movement, which may be desirable for applications wherein the entire display area need not be used for payload data.

According to another preferred embodiment of this aspect of the invention, an information area on the display is presumed to present editable symbols, e.g. representing text. Here, the processing module is adapted to determine at least one added symbol based on a movement sequence of the point of regard over a number of on-screen objects visually representing GUI-components of a software keyboard presented on the display. The processing module is further adapted to supplement the symbols in the information area with the at least one added symbol. Hence, the user may efficiently enter text into the computer apparatus.

According to still another preferred embodiment of this aspect of the invention, the processing module is adapted to investigate whether the point of regard fulfills an activation criterion with respect to an active control object representing a deletion key. If such a criterion is found to be fulfilled, the processing module is adapted to delete a sub-set of the symbols from the editable symbols. Thereby, the user may also conveniently edit an existing text stored in the computer apparatus.

According to yet another preferred embodiment of this aspect of the invention, the set of control objects includes a single control object. Here, the processing module is adapted to determine a target location for the first saccade outside the activation zone. The processing module is adapted to present the single control object at the target position. Again, the single control object includes the data-manipulating window. Analogous to the above, the processing module is adapted to move the cursor symbol over the display in agreement with a navigation direction expressed by the first saccade. This design is desirable because it allows the user to accomplish the desired cursor navigation without having to move his/her point of regard after the first saccade. Moreover, the navigation direction may be chosen freely.

According to a further preferred embodiment of this aspect of the invention, the processing module is adapted to investigate whether the point of regard fulfills a deactivation criterion with respect to the active control object. If the processing module finds that such a criterion is fulfilled, the module is adapted to deactivate this active control object. Typically, this deactivation is equivalent to a completed manipulation, and/or that a different manipulation is desired.

According to another aspect of the invention the object is achieved by the initially described method, wherein it is investigated whether the movement sequence of the point of regard fulfills an activation criterion with respect to an activation zone for any of the at least one control command. If such a criterion is found to be fulfilled, the method involves presenting a data-manipulating window, which is positioned relative to an active control object on the display such that a center point of the window is located within a relatively small offset distance from a center point of the active control object. This window, in turn, includes graphical information, which symbolizes an activity portion of the display that presently is the object of an eye-tracker-controlled entry of control commands. Additionally, the method involves updating repeatedly the information in the data-manipulating window in response to the eye-tracker-controlled entry of control commands.

The advantages of this method, as well as the preferred embodiments thereof, are apparent from the discussion hereinabove with reference to the proposed system.

According to yet a further aspect of the invention the object is achieved by a computer program, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above-proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

FIG. 7 illustrates how a graphical object may be rotated by means of control objects according to one embodiment of the invention;

FIG. 8 illustrates how the color of a graphical object may be modified by means of control objects according to one embodiment of the invention; and FIG. 9 illustrates, by means of a flow diagram, a general method according to the invention.

DESCRIPTION OF PREFERRED EMBODIMENTS OF THE INVENTION

Figure 1:
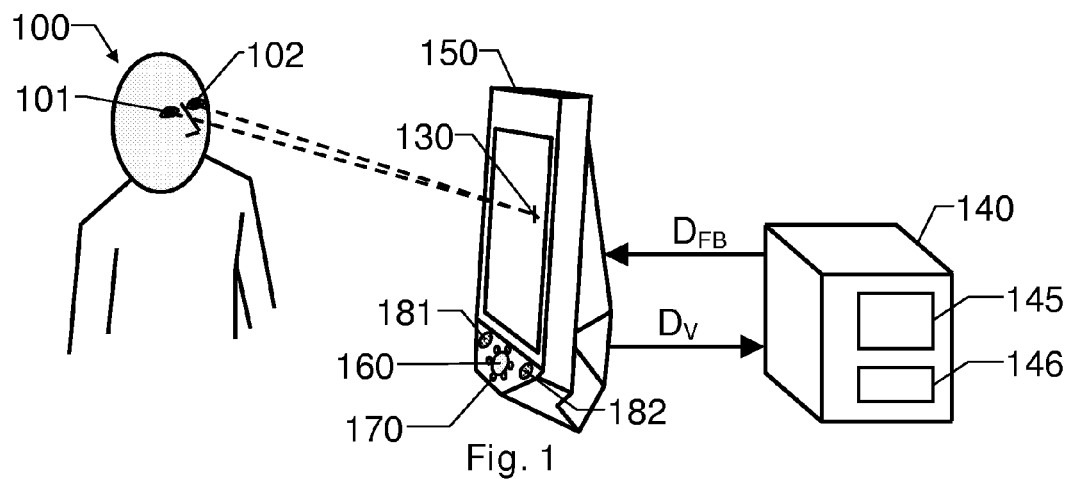
FIG. 1 shows a schematic picture of an eye-tracking system according to one embodiment of the invention.

We refer initially to FIG. 1, which shows a schematic picture of an eye-tracking system according to one embodiment of the invention. The system includes a computer apparatus 140 and an associated graphical display 150. It is presumed that the computer apparatus 140 presents at least one on-screen representation of at least one GUI-component on the display 150, wherein the least one GUI-component is controllable in response to commands originated by an eye-tracker means.

The eye-tracker means includes an imaging device 160, e.g. including a video camera. Preferably, the eye-tracker means also includes one or more light sources, for instance a first set of light sources 170 located relatively proximate to an optical axis of the imaging device 160, and a second set of light sources 181 and 182 located relatively remote from the optical axis of the imaging device 160. Thereby, both bright-pupil (BP) PCCR-tracking and dark-pupil (DP) PCCR-tracking of a user's 100 eyes 101 and 102 is enabled. In any case, the eye-tracker means is adapted to repeatedly determine the user's 100 point of regard 130 on the display 150.

The eye-tracker means is further adapted to enter control commands into the computer apparatus 140 in response to movement sequences of the point of regard 130 over the display 150. To this aim, the eye-tracker means includes a processing module 145, which may be a part of the computer apparatus 140. The processing module 145 is adapted to receive eye-tracking data $D_V$ and extract the control commands there from. The processing module 145 is also adapted to produce graphical feedback information $D_{FB}$ for presentation on the display 150 to visually confirm any entered control commands.

According to the invention, the processing module 145 is further adapted to cause a data-manipulating window to be presented on the display 150. This window includes graphical information, which symbolizes a portion of the display 150 that contains objects based upon which eye-tracker-generated control commands are entered into the computer apparatus 140. This means that the data-manipulating window either includes duplicate information of the graphical data within the activity portion 210, an icon schematically representing this data, or another form of unambiguous image of the data. The details of regarding the presentation and control procedure will be discussed in depth below with reference to FIGS. 2 to 9.

Figure 2A:
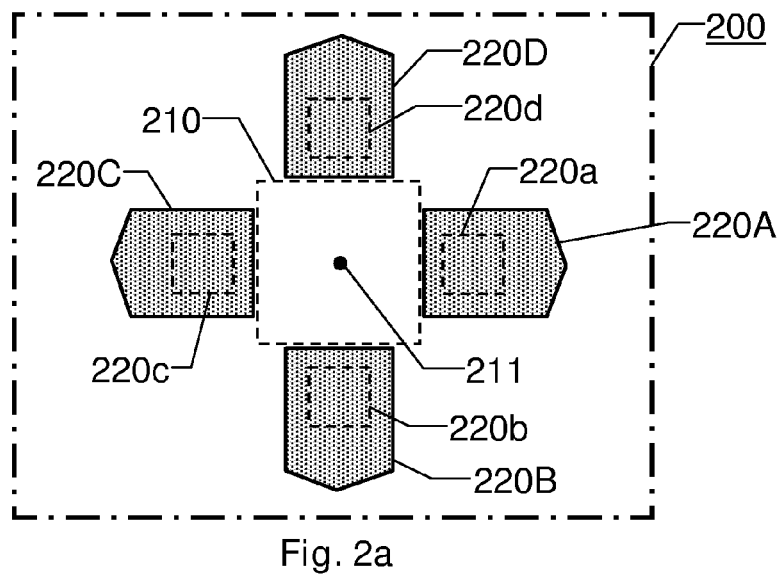
FIGS. 2*a-b* illustrate a first use of a set of a first set of control objects according to one embodiment of the invention.

FIG. 2*a* shows a subsection 200 of an image area of the display 150 in the FIG. 1. The subsection 200 contains a set of control objects 220A, 220B, 220C and 220D, which are adapted to present a respective data-manipulating window 220*a*, 220*b*, 220*c* and 220*d*. Preferably, each object in the set is adapted to indicate a respective navigation direction for a cursor symbol relative to an information area on the display 150, e.g. rightwards, downwards, leftwards and upwards respectively. Preferably, however, at a given time instance, no more than one of the control objects presents such a data-manipulating window, and before an eye-tracker-controlled entry of control commands has been initiated preferably no data-manipulating window at all is shown.

Nevertheless, the set of control objects 220A, 220B, 220C and 220D is centred around a point 211 in a so-called activity portion 210. The activity portion 210 is an area of the display 150 that contains one or more graphical elements in respect of which eye-tracker-generated control commands are generated and entered into the computer apparatus 140. Thus, the activity portion 210 is centered around an on-screen object in respect of which control commands may be fed into the computer apparatus 140.

Figure 2B:
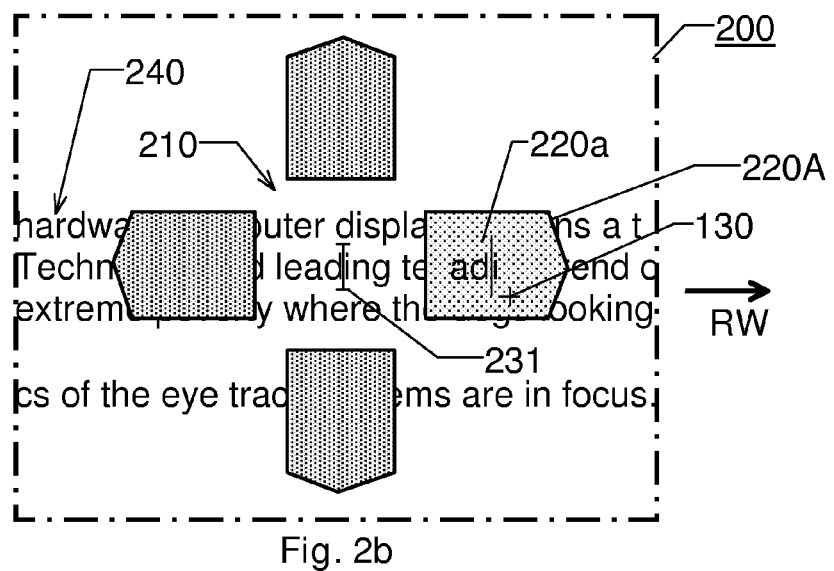

Turning now to FIG. 2b we will explain how the activity portion 210 is selected according to one preferred embodiment of the invention to control a cursor symbol 231 across a display's image area. The FIG. 2b shows the set of control objects 220A, 220B, 220C and 220D overlaid an information area 240 containing editable text. The processing module 145 is adapted to investigate whether the point of regard 130 fulfills an activation criterion. Here, this criterion relates to the cursor symbol 231 and its intended movement. Specifically, the activation criterion is regarded as fulfilled if the point of regard 130 has been located within an activation zone 210 around the cursor symbol 231 during at least an activation interval, i.e. whether the user's gaze has been directed sufficiently close to the cursor symbol for a sufficiently long time. If the processing module 145 finds this criterion to be fulfilled, the module 145 presents the set of control objects 220A, 220B, 220C and 220D as shown in the FIG. 2b, i.e. centred around the cursor symbol 231. Hence, the activity portion 210 is here represented by an area to the left and right of the cursor symbol 231, which is located between the control objects 220A, 220B, 220C and 220D. Since in this case, the cursor symbol 231 is a text entry marker it is also possible to manipulate the text to the left and the right of the cursor symbol 231, i.e. delete symbols and/or add new symbols.

Naturally, according to the invention, it is not precluded that the processing module 145 causes one or more of the control objects 220A, 220B, 220C and 220D to be presented also under other conditions, for example constantly, irrespective of whether the activation criterion is fulfilled or not.

Nevertheless, here, we assume that after the above-mentioned activation, the user 100 moves the point of regard 130 by means of a saccade in a general rightward direction. According to this embodiment of the invention, the processing module 145 is adapted to interpret such a saccade as a user intention to move the cursor symbol 231 to the right over the display. Hence, the processing module 145 detects and interprets the saccade as an expression of a navigation direction RW to the right with respect to the display 150. As a result, the processing module 145 presents a data-manipulating window 220a in the control object 220A the display 150, which is adapted to accomplish a rightward movement of the cursor-symbol 231. The window 220a includes graphical information duplicating the activity portion 210, which in this example means that the window 220a shows the letters "adi", i.e. two letters "ad" to the left of the cursor symbol 231 and a single letter "i" to the right of the cursor symbol 231. Of course, any larger or slightly smaller window 220a is equally well conceivable, as well as various forms of gradually fading or partly hidden representations of the letters in the window 220a proximate to the left and right window borders.

According to the invention, the processing module 145 is adapted to repeatedly update the information in the data-manipulating window 220a in response to the eye-tracker-controlled entry of control commands into the computer apparatus 140. Here, this means that the two letters to the left and the single letter to the right of the cursor symbol 231 respectively are altered according to the contents of the text in the information area 240 as the cursor symbol 231 moves over the display 150 as specified by the navigation direction RW.

According to one preferred embodiment of the invention, the processing module 145 is also adapted to present the set of control objects 220A, 220B, 220C and 220D on the display 150 in such a manner that this set moves gradually across the display 150 in agreement with the navigation direction RW. This means that the relative positions of the cursor symbol 231 and the set of control objects 220A, 220B, 220C and 220D remain constant, however they all move together across the display 150. Thereby, a stabile cursor control mechanism is accomplished, which is desirable also in non-text applications.

Figure 3:
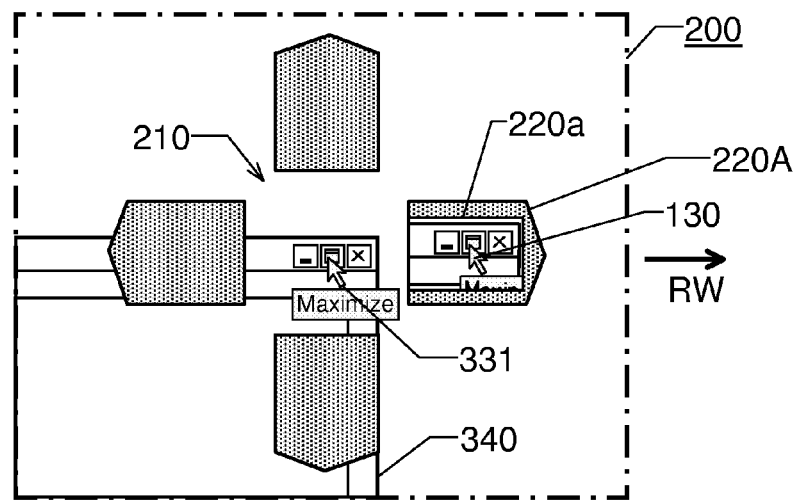
FIG. 3 illustrates a second use of the first set of control objects shown in the FIGS. 2*a-b*.

FIG. 3 illustrates one such example, wherein the set of control objects 220A, 220B, 220C and 220D shown in the FIGS. 2a and 2b are used to control a cursor symbol 331 in respect of a subsection 200 of an image area of the display 150 containing an information area in the form of a window 340.

Analogous to the above, we assume that the user 100 has located the point of regard 130 within an activation zone around the cursor symbol 331 during at least an activation interval. Therefore, the processing module 145 has caused the set of control objects 220A, 220B, 220C and 220D to be presented around an activity area 210 containing the cursor symbol 331.

Moreover, the user has performed a first saccade to the right to express a navigation direction RW, and as a result, the processing module 145 has activated a control object 220A adapted to accomplish a rightward movement of the cursor symbol 331 and presented a data-manipulating window 220a therein. Furthermore, we assume that the processing module 145 has investigated whether the user's 100 point of regard 130 has been located on the active control object 220A during a threshold dwell time, and found this criterion to be fulfilled. Therefore, the processing module 145 has initiated a rightward cursor movement over the display 150, i.e. in agreement with the navigation direction RW.

Again, the presented data-manipulating window 220a includes graphical information, which symbolizes the activity portion 210. In contrast to the example discussed above with reference to the FIG. 2b, the cursor symbol 331 being controlled in response to eye-tracker generated control commands is here adapted to manipulate graphical objects, such as windows, software implemented buttons, scroll bars, slide controls etc. Nevertheless, since the cursor symbol 331 is the object based upon which the control commands are entered into the computer apparatus 140, the cursor symbol 331 remains within the activity portion 210.

The processing module 145 also repeatedly updates the information in the data-manipulating window 220a in response to generated control commands (here represented by the navigation direction RW), such that when the cursor symbol 331 moves rightwards over the display's 150 image area, a contents of the window 340 located to the right of an initially position displayed position gradually appears in the data-manipulating window 220a.

Figure 4:
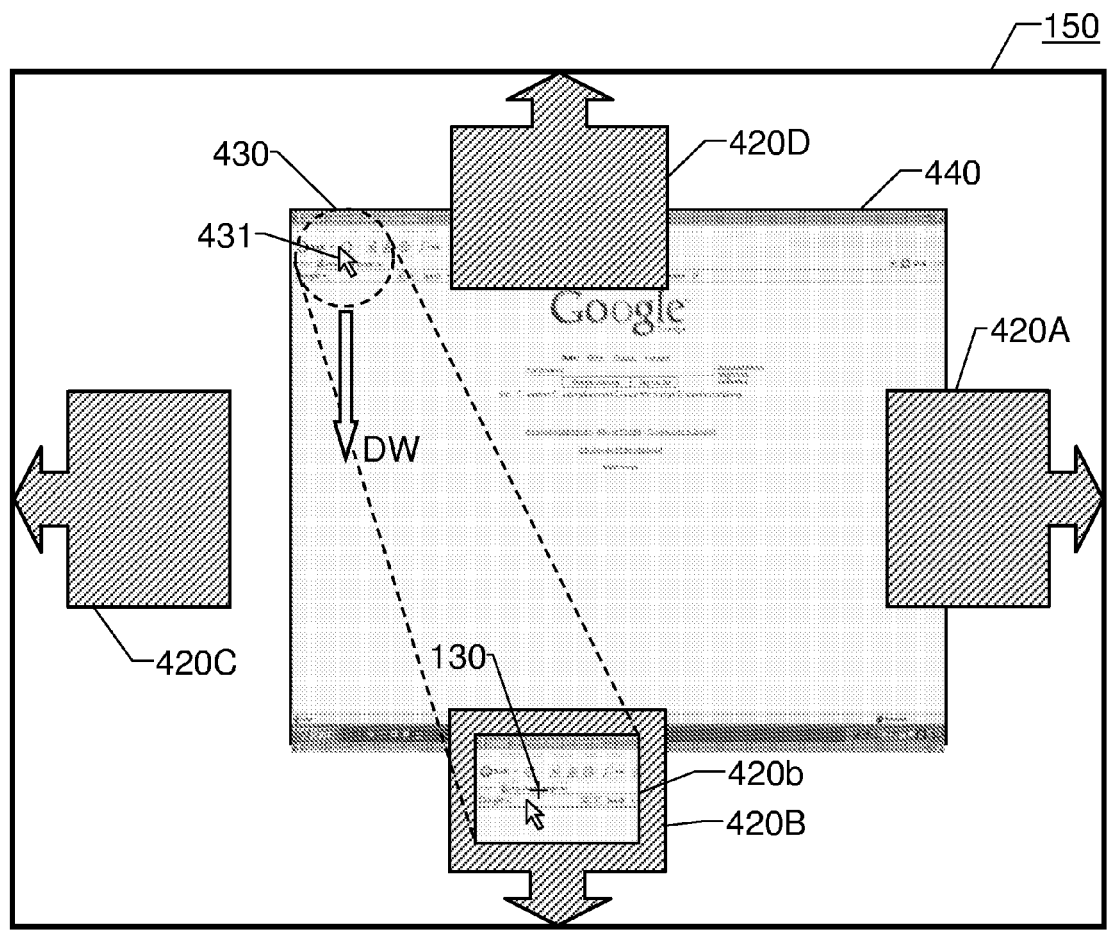
FIG. 4 illustrates a use of a second set of control objects according to one embodiment of the invention.

FIG. 4 illustrates how an alternative set of control objects 420A, 420B, 420C and 420D can be employed according to one embodiment of the invention to control a cursor symbol 431 over the display 150. Here, the display 150 shows an information area containing a window 440. However, this embodiment is equally well applicable to other types of information, such as the text 240 of FIG. 2b.

Again, we assume that the user 100 has located the point of regard 130 within an activation zone 430 around the cursor symbol 431 during at least an activation interval. Therefore, the processing module 145 has caused the set of control objects 420A, 420B, 420C and 420D to be presented on the display 150, such that a particular control object is positioned proximate to each side of the display 150. Alternatively, the control objects 420A, 420B, 420C and 420D are always presented on the display 150 irrespective of whether the above activation criterion is fulfilled or not. In any case, a first control object 420A is located at a fixed position on the right side of the of the display 150 and is preferably adapted to accomplish a rightward movement of the cursor symbol 441, a second control object 420B is located at a fixed position on the lower side of the of the display 150 and is preferably adapted to accomplish a downward movement of the cursor symbol 441, a third control object 420C is located at a fixed position on the left side of the of the display 150 and is preferably adapted to accomplish a leftward movement of the cursor symbol 441, and a fourth control object 420D is located at a fixed position on the upper side of the of the display 150 and is preferably adapted to accomplish an upward movement of the cursor symbol 441.

Additionally, the user has performed a first saccade downwards to express a desired navigation direction DW. As a result, the processing module 145 has activated the second control object 420B and presented a data-manipulating window 420*b* therein. Furthermore, we assume that user 100 has fixated his/her point of regard 130 on the active control object 420B during a threshold dwell time, and that therefore the processing module 145 has initiated a downward cursor movement over the display 150.

Consequently, the data-manipulating window 420*b* includes graphical information, which initially duplicates a display area, e.g. essentially equivalent to the activation zone 430. However, as the user 100 maintains the point of regard 130 on the active control object 420B and thus controls the cursor symbol 431 downwards, the processing module 145 repeatedly updates the contents of the window 420*b* to reflect the cursor symbol's 431 downward movement in the navigation direction DW, preferably while maintaining a representation of the cursor symbol 431 at a constant position in the window 420*b*.

According to one preferred embodiment of the invention, the processing module 145 is adapted to investigate whether the point of regard 130 has been located outside of the active control object 420B during a movement deactivation period, say in the order of 0.5 s. If this criterion is fulfilled, the processing module 145 is adapted to deactivate the active control object 420B, and thus abort the eye-tracker-controlled entry of control commands, i.e. in this example the downward movement of the cursor symbol 431.

This stop feature, which is applicable to all the embodiments of the present invention, provides a very efficient means for the user 100 to indicate to the system that the presently entered control commands shall cease, and that possibly a different type of commands instead should be generated.

Figure 5:
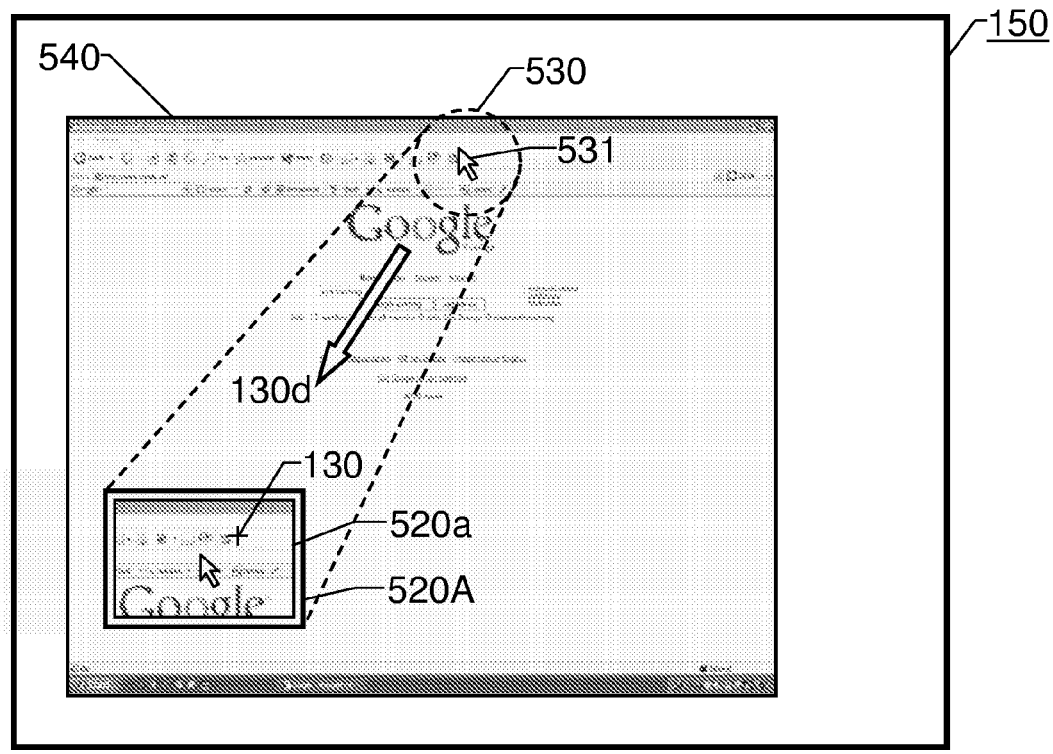
FIG. 5 illustrates a use of a third type of control object according to one embodiment of the invention.

FIG. 5 illustrates how a third type of proposed control object 520A may be used according to one embodiment of the invention to influence a cursor symbol 531 based on eye-tracker generated control commands entered into the computer apparatus 140. According to this embodiment, the set of control objects includes a single control object 520A, which may be presented at an arbitrary position on the display's 150 image area.

Specifically, after that the processing module 145 has determined that the user 100 has located the point of regard 130 within an activation zone 530 around the cursor symbol 531 during at least an activation interval, the processing module 145 is adapted to not only determine a direction 130*d* of a first saccade 130*d* outside the activation zone 530, however also a target location for such a saccade. The processing module 145 is then adapted to present the control object 520A at this location, for example centered there over.

Analogous to the above-described embodiments, the control object 520A includes a data-manipulating window 520*a*, which includes graphical information symbolizing an activity portion of the display 150 that presently is the subject to an eye-tracker-controlled entry of control commands into the computer apparatus 140, namely in this example, the cursor symbol 531. Moreover, also here, the processing module 145 is adapted to move the cursor symbol 531 over the display 150 in agreement with the navigation direction 130*d*. It is worth noting that the navigation direction 130*d* can have any angle (0°-360°) to a reference direction, and is thus not limited to the horizontal and vertical right/left and down/up directions described earlier.

Figure 6:
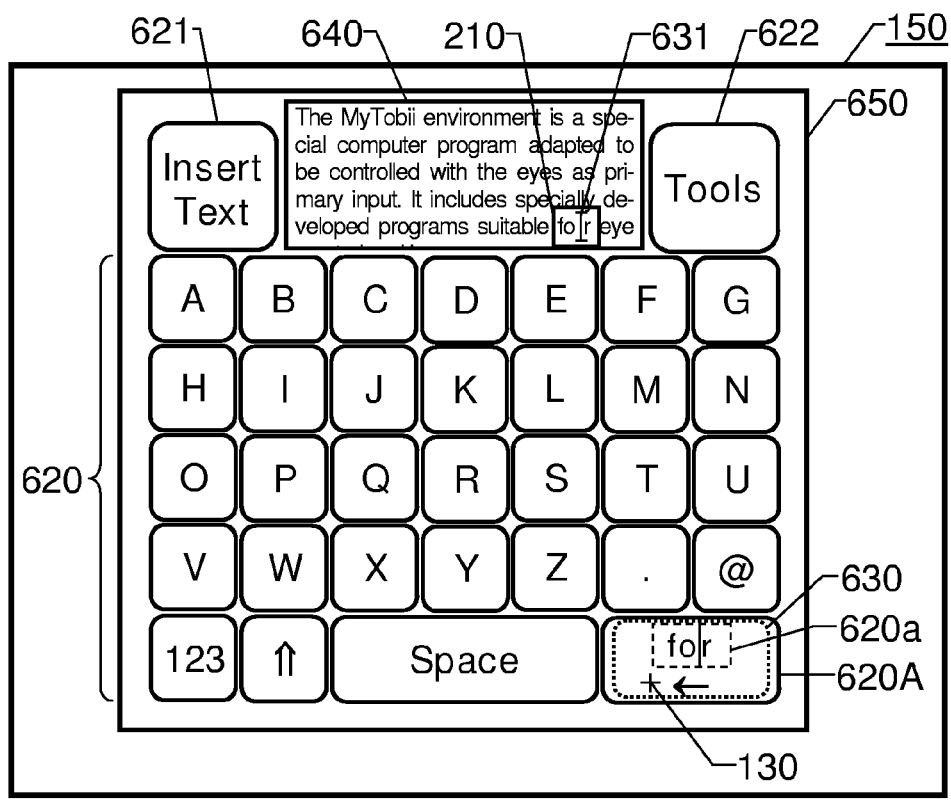
FIG. 6 shows an on-screen object implementing a software keyboard on the display, which is controllable in response to a movement sequence of a user's point of regard according to one embodiment of the invention.

FIG. 6 shows an on-screen object that implements a software keyboard 650 on the display 150, wherein the keyboard 650 is controllable in response to a movement sequence of a user's point of regard 130 according to one embodiment of the invention. The keyboard 650 is associated with an information area 640, which is adapted to present editable symbols, for example representing text. A cursor symbol 631 denotes a position in the information area 640, which presently is possible manipulate.

The keyboard 650 includes a set of keys 620 adapted to be eye-controlled to enter alphabetic symbols, numbers and other kinds of characters into the computer apparatus 140. The keyboard 650 may also include a number of on-screen objects 620A, 621 and 622 that visually represent GUI-components of software keys on the display 150, which enable the user 100 to perform various editing functions based on eye-tracker generated control commands. Thus, each of the items 620, 620A, 621 and 622 constitutes a control object of the type described above.

The processing module 145 is here adapted to determine whether the user 100 has located the point of regard 130 relative to these control objects, such that an activation criterion in respect of a particular control object has been fulfilled. Provided that a specific control object is activated, the manipulation accomplished thereby occurs at a current position for the cursor symbol 631. The cursor symbol 631, in turn, may either be moved with respect to the information area 640 as described above, for instance with reference to the FIGS. 2*a* and 2*b*, or by any other cursor-control means known in the art.

Provided that the user has controlled the cursor symbol 631 to a desired position in the information area 640, analogous to the above, the processing module 145 then investigates whether an activation criterion in respect to any of the control objects 620, 620A, 621 and 622 is fulfilled. For illustrating purposes, in this example, we assume that a backspace/delete key 620A thus has been activated based on a movement sequence of a point of regard 130 relative to an activation zone 630 for this key 620A, for example that the user 100 has located the point of regard 130 within the activation zone 630 during at least an activation interval. We also assume that the cursor symbol 631 is located between the letters "o" and "r" in the word "for" as shown in the FIG. 6, thus defining an activity portion 210 of the information area 640. Since the key 620A is adapted to accomplish deletion of the symbol located immediately left of the cursor symbol's 631 current position, i.e. here the letter "o", this letter will be erased in connection with activation of the key 620A. As a further result, the cursor symbol 631 will thereafter be positioned between the letters "f" and "r".

Similar to the embodiment of the invention described above with reference to the FIG. 2b, when activating the key 620A a data-manipulating window 620a in the active control object represented by this key 620A initially includes graphical information symbolizing an activity portion around the cursor symbol 641. In this example the window 620a shows the letters "for", i.e. two letters "fo" to the left of the cursor symbol 631 and a single letter "r" to the right of the cursor symbol 231. Again, any smaller or larger window 620a that can be fitted into the key 620A is equally well conceivable. Moreover, the symbols in the window 620a can be displayed to gradually fade, or be partly hidden proximate to one, or both, of the left and right borders of the window 620a.

Naturally, by selecting any of the other keys 620, the processing module 145 may instead determine one or more added symbol based on movement sequences of the point of regard 130 over the keyboard 650, and supplement the symbols in the information area 640 with such added symbols. Hence, according to this embodiment of the invention, a number, preferably all, of the key 620, 620A, 621 and 622 are adapted to present a respective data-manipulating window in case the key is selected as the active control object.

FIG. 7 illustrates how an on-screen representation 740 of a GUI-component may manipulated according to one embodiment of the invention, namely be subjected to rotation. According this embodiment, a first control object 720A and a second control object 720B are presented on the display. Upon activation, the first control object 720A is adapted to accomplish a clockwise rotation of the on-screen representation of a selected graphical object, whereas the second control object 720B is adapted to accomplish a counter clockwise rotation. Here, a control object, say the second control object 720B, is activated by moving the point of regard 130 over the display such that the point of regard 130 first fulfills an activation criterion with respect to a graphical representation 740, e.g. by the point of regard 130 being located within an activation zone 730 during an activation interval. Then, the point of regard 130 is moved, typically in the form of a saccade, to the second control object 720B. Provided that the point of regard 130 remains located on this object 720B at least during a threshold dwell time, a data-manipulating window 720b is presented in the second control object 720B to confirm the activation. The data-manipulating window 720b shows graphical information that symbolizes the graphical representation 740, i.e. the present object of the eye-tracker-controlled counter clockwise rotation.

Moreover, as the graphical representation 740 is rotated on the display, the information in the data-manipulating window 720b reflecting this fact is repeatedly updated. Preferably, the rotation continues gradually as long as control object 720B remains active, either in relatively small steps (e.g. 1 degree per update at an updating rate of 4 updatings per second), or in relatively large steps (e.g. 90 degrees per update at an updating rate of one updating per second). Whenever the user is satisfied with the accomplished rotation, he/she moves the point of regard 130, such that the deactivation criterion becomes fulfilled, for example by placing the point of regard 130 outside the control object 720B during a deactivation threshold time.

FIG. 8 illustrates yet another type of eye-controlled manipulation of graphical objects enabled according to one embodiment of the present invention. Here, an on-screen representation 840 of a GUI-component may be controlled to change colors. A first control object 820A is adapted to color a selected object red, a second control object 820B is adapted to color a selected object blue, and a third control object 820C is adapted to color a selected object green. Again, a particular graphical representation 840 is selected by moving the point of regard 130 over the display, such that the point of regard 130 fulfills an activation criterion with respect to the particular graphical representation 840. Preferably, the activation criterion is regarded as fulfilled if the point of regard 130 has been located within an activation zone 830 around the particular graphical representation 840 during an activation interval.

Then, the point of regard 130 saccades to a control object, say the second control object 820B, where the point of regard 130 remains at least during a threshold dwell time. Subsequently, a modification of the graphical representation 840 designated by the second object 820B is accomplished, in this case a color change into blue. To confirm this modification, a data-manipulating window 820b showing graphical information that symbolizes the graphical representation 840 is presented in the second control object 820B. Hence, in connection with the graphical representation 840 changing its color to blue, this fact is reflected by symbolic information in the data-manipulating window 820b.

Of course, analogous to the above, other properties of a GUI-component may also be altered, such as textures. Hence, according to one embodiment of the invention, a set of eye-controllable control objects are presented on the display, which are adapted to influence a particular texture being mapped to the GUI-component's on-screen representation.

To sum up, the general method according to the invention of controlling a computer apparatus will now be described with reference to the flow diagram in FIG. 9.

An initial step 910 determines a user's point of regard on the display. A step 920 then investigates whether an activation criterion has been fulfilled, and if so a step 930 follows. The activation criterion may be regarded as fulfilled if, during at least an activation interval, the point of regard has been located within an activation zone of an on-screen object based upon which eye-tracker controlled commands may be entered into a computer apparatus. Alternatively, the activation criterion may be regarded as fulfilled if, during the activation interval, the point of regard has been located on the control object more than any of its neighboring control objects. If, however, the activation criterion not is fulfilled, the procedure loops back to the step 910.

The step 930 defines the control object as active and presents a data-manipulating window relative to the active control object on the display, such that a center point of the window is located within a relatively small offset distance from a center point of the active control object. For example, the data-manipulating window may be presented in the active control object, or such that the window partly overlaps the active control object. The control object to be activated may be identified by a first saccade in the point of regard registered from the activation zone, and the control object represents at least one control command to be entered into the computer apparatus. The data-manipulating window includes graphical information, which symbolizes an activity portion of the display presently being the on-screen object based upon which the eye-tracker-controlled commands are produced.

Subsequently, a step 940 investigates whether a deactivation criterion is fulfilled with respect to the active control object. Preferably, the deactivation criterion is the complement to the above-mentioned activation criterion. Thus, the deactivation criterion is regarded as fulfilled if the activation criterion no longer is fulfilled. Naturally, a deactivation criterion in respect a first active control object is generally regarded as fulfilled if the activation criterion for a second active control object is fulfilled. Nevertheless, if the deactivation criterion is fulfilled, the procedure loops back to the step 910. Otherwise, a step 950 follows in which the information in the data-manipulating window is updated in response to the at least one control command represented by the active control object.

All of the process steps, as well as any sub-sequence of steps, described with reference to the FIG. 9 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Versatile/Video Disc), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as an acknowledgement or any suggestion that the referenced prior art forms part of the common general knowledge in Australia.

The invention is not restricted to the described embodiments in the figures, but may be varied freely within the scope of the claims.

The invention claimed is:

1. A system for controlling a computer apparatus associated with a graphical display, the computer apparatus being adapted to present a respective on-screen representation of at least one GUI-component on the display, the system comprising;

an eye-tracker system adapted to determine a user's point of regard on the display and in response to movement sequences of the point of regard over the display enter control commands into the computer apparatus, the eye-tracker system comprising a processing module adapted to produce graphical feedback information for presentation on the display to visually confirm any entered control commands, wherein the processing module is adapted to:

investigate whether the movement sequence of the point of regard fulfills an activation criterion with respect to an activation zone for any of the at least one control command, and if such a criterion is found to be fulfilled; and present a data-manipulating window separate from and at a position relative to an active control object on the display such that a center point of the window is located within a relatively small offset distance from a center point of the active control object, the window comprising graphical information which symbolizes an activity portion of the display presently being the object of an eye-tracker-controlled entry of control commands, the window being presented such that the activity portion and the window do not overlap and are simultaneously visible on the display, and wherein the information in the data-manipulating window repeatedly updates in response to the eye-tracker-controlled entry of control commands.

2. The system according to claim 1, wherein the processing module is adapted to determine the active control object based on the movement sequence of the point of regard relative to the activation zone.

3. The system according to claim 2, wherein the movement sequence of the point of regard based on which the processing module is adapted to determine the active control object comprises a first saccade from the activation zone.

4. The system according to claim 1, wherein the at least one control command expresses at least one of:

a navigation direction for a cursor symbol with respect to the display, a rotation of at least one on-screen representation of at least one GUI-component on the display, a color change of at least one on-screen representation of at least one GUI-component on the display, or a texture modification of at least one on-screen representation of at least one GUI-component on the display.

5. The system according to claim 4, wherein the at least one control command expresses a navigation direction for a cursor symbol with respect to the display; and the processing module is adapted to:

discriminate a navigation direction from a first saccade relative-to the activation zone, and move a cursor symbol over the display in agreement with the navigation direction.

6. The system according to claim 5, wherein the processing module is adapted to present a set of control objects on the display, each control object in the set being adapted to indicate a respective navigation direction for a cursor symbol relative to an information area.

7. The system according to claim 6, wherein the processing module is adapted to:

present the set of control objects on the display in such a manner that said set moves gradually across the display in agreement with the navigation direction, and move the cursor over the display in agreement with the navigation direction.

8. The system according to claim 6, wherein the processing module is adapted to:

present the set of control objects at fixed positions on the display, and move the cursor symbol over the display in agreement with the navigation direction.

9. The system according to claim 1, wherein the display presents an information area comprising editable symbols, and
wherein the processing module is adapted to:
determine at least one added symbol based on a movement sequence of the point of regard over a number of on-screen objects visually representing GUI-components of a software keyboard presented on the display, and
supplement the symbols in the information area with the at least one added symbol.

10. The system according to claim 1, wherein the display presents an information area comprising editable symbols, and
wherein the processing module is adapted to:
investigate whether the point of regard fulfills an activation criterion with respect to an active control object representing a deletion key, and
if such a criterion is found to be fulfilled, delete a sub-set of the symbols, the sub-set comprising at least one of the editable symbols.

11. The system according to claim 1, wherein the set of control objects comprises a single control object, and
wherein the processing module is adapted to:
determine a target location for a first saccade outside the activation zone,
present the single control object at the target position, the single control object including the data-manipulating window, and
move the cursor symbol over the display in agreement with a navigation direction expressed by the first saccade.

12. The system according to claim 1, wherein the processing module is adapted to:
investigate whether the point of regard fulfills a deactivation criterion with respect to the active control object, and
if such a criterion is found to be fulfilled deactivate the active control object.

13. A method of controlling a computer apparatus being associated with a graphical display, the computer apparatus being adapted to present a, respective on-screen representation of at least one GUI-component on the display, the method comprising:
determining a user's point of regard on the display and-in response to movement sequences of the point of regard over the display;
receiving control commands entered into the computer apparatus;
producing graphical feedback information for presentation on the display to visually confirm any entered control commands;
investigating whether the movement sequence of the point of regard fulfills an activation criterion with respect to an activation zone for any of the at least one control command, and if such a criterion is found to be fulfilled;
presenting a data-manipulating window separate from and at a position relative to an active control object on the display such that a center point of the window is located within a relatively small offset distance from a center point of the active control object, the window comprising graphical information which symbolizes an activity portion of the display presently being the object of an eye-tracker-controlled entry of control commands, the window being presented such that the activity portion and the window do not overlap and are simultaneously visible on the display; and
updating repeatedly the information in the data-manipulating window in response to the eye-tracker-controlled entry of control commands.

14. The method according to claim 13, further comprising:
determining the active control object based on the movement sequence of the point of regard relative to the activation zone.

15. The method according to claim 14, wherein the movement sequence of the point of regard, based on which the processing module is adapted to determine the active control object, comprises a first saccade from the activation zone.

16. The method according to claim 13, wherein the at least one control command further comprising:
expressing at least one of:
a navigation direction for a cursor symbol with respect to the display,
a rotation of at least one on-screen representation of at least one GUI-component on the display, a color change of, at least one on-screen representation of at least one GUI-component on the display, or
a texture modification of at least one on-screen representation of at least one GUI-component on the display.

17. The method according to claim 16, wherein the at least one control command expresses a navigation direction for a cursor symbol with respect to the display and the method further comprising:
discriminating a navigation direction from a first saccade relative to the activation zone, and moving a cursor symbol over the display in agreement with the navigation direction.

18. The method according to claim 17, further comprising:
presenting a set of control objects on the display, each control object in the set being adapted to indicate a respective navigation direction for a cursor symbol relative to an information area.

19. The method according to claim 18, further comprising:
presenting the set of control objects on the display in such a manner that said set moves gradually across the display in agreement with the navigation direction; and
moving the cursor over the display in agreement with the navigation direction.

20. The method according to claim 18, further comprising:
presenting the set of control objects at fixed positions on the display; and
moving the cursor symbol over the display in agreement with the navigation direction.

21. The method according to claim 13, wherein the display presents an information area comprising editable symbols, and the method further comprising:
determining at least one added symbol based on a movement sequence of the point of regard over a number of onscreen objects visually representing GUI-components of a software keyboard presented on the display; and
supplementing the symbols in the information area with the at least one added symbol.

22. The method according to claim 13, wherein the display presents an information area comprising editable symbols, and the method further comprising:

investigating whether the point of regard fulfills an activation criterion with respect to an active control object representing a deletion key, and if such a criterion is found to be fulfilled; and deleting a sub-set of the symbols, the sub-set comprising at least one of the editable symbols.

23. The method according to claim 13, wherein the set of control objects comprising a single control object, and the method further comprising:

determining a target location for a first saccade outside the activation zone;

presenting the single control object at the target position, the single control object including the data-manipulating window; and moving the cursor symbol over the display in agreement with a navigation direction expressed by the first saccade.

24. The method according to claim 13, further comprises:

investigating whether the point of regard fulfills a deactivation criterion with respect to the active control object, and if such a criterion is found to be fulfilled;

deactivating the active control object.

25. A computer program product comprising a non-transitory computer readable medium directly loadable into the internal memory of a computer, wherein the non-transitory computer-readable medium comprises one or more computer-executable program code portions that, when executed by a computer, causes the computer to:

perform the process of claim 13.

26. A non-transitory computer readable medium, having a program recorded thereon, where the program is to make a computer perform the process of claim 13.

* * * * *